(12) United States Patent
Gokavarapu et al.

(10) Patent No.: US 10,970,141 B2
(45) Date of Patent: *Apr. 6, 2021

(54) INTEGRATING TRANSACTION PROCESSING SYSTEM INTERFACES WITH EVENT-DRIVEN POLYGLOT RUNTIME MODULES

(71) Applicant: INTERNATIONAL BUSINESS MACHINES CORPORATION, Armonk, NY (US)

(72) Inventors: Nageswararao V. Gokavarapu, Bangalore (IN); Gopalakrishnan P, Bangalore (IN); Parameswaran Selvam, Bangalore (IN); Hariharan N. Venkitachalam, Bangaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,856

(22) Filed: Jun. 27, 2019

(65) Prior Publication Data
US 2019/0317840 A1   Oct. 17, 2019

Related U.S. Application Data

(63) Continuation of application No. 15/591,280, filed on May 10, 2017, now Pat. No. 10,379,916.

(51) Int. Cl.
*G06F 9/54* (2006.01)
*G06F 9/46* (2006.01)

(52) U.S. Cl.
CPC .............. *G06F 9/542* (2013.01); *G06F 9/466* (2013.01); *G06F 9/541* (2013.01)

(58) Field of Classification Search
CPC ........... G06F 9/542; G06F 9/541; G06F 9/466
See application file for complete search history.

(56) References Cited

U.S. PATENT DOCUMENTS 6,138,169 A   10/2000  Freund et al.
8,074,220 B2  12/2011  Thole
(Continued)

FOREIGN PATENT DOCUMENTS

CN          103106218          5/2013

OTHER PUBLICATIONS

Syta, James M.; List of IBM Patents or Patent Applications Treated as Related; Jun. 27, 2019; 1 page.
(Continued)

*Primary Examiner* — Tuan C Dao
(74) *Attorney, Agent, or Firm* — Schmeiser, Olsen & Watts; William H. Hartwell

(57) ABSTRACT

An approach is provided for providing transactional operations in an event-driven polyglot language runtime environment. Native functionalities of a transaction processing system are exposed as interfaces to multiple languages and frameworks in the runtime environment. The transactional operations are called from modules. The transaction processing system is integrated with the modules. A prepare operation is sent to a resource manager (RM) via a resolution thread. For a committed transaction outcome of the resolution thread, the commit is logged, an indication of the commit is sent to the RM, the commit is performed, a completion indication of the commit is sent, and a forget operation is logged. For a rollback transaction outcome of the resolution thread, the rollback is logged, an indication of the rollback is sent to the RM, the rollback is performed, a completion indication of the rollback is sent, and the forget operation is logged.

19 Claims, 9 Drawing Sheets

(56) References Cited

U.S. PATENT DOCUMENTS

| | | | |
|---|---|---|---|
| 8,271,996 B1* | 9/2012 | Gould | G06F 9/542 |
| | | | 719/312 |
| 8,719,831 B2 | 5/2014 | Radmilac et al. | |
| 9,378,062 B2 | 6/2016 | Ringseth et al. | |
| 2002/0016867 A1* | 2/2002 | Kampe | H04L 43/00 |
| | | | 719/318 |
| 2002/0103663 A1* | 8/2002 | Bankier | G06Q 20/00 |
| | | | 709/224 |
| 2002/0143857 A1* | 10/2002 | Bidarahalli | G06F 9/542 |
| | | | 709/203 |
| 2003/0200212 A1 | 10/2003 | Benson | |
| 2004/0098731 A1* | 5/2004 | Demsey | G06F 9/45537 |
| | | | 719/328 |
| 2004/0123299 A1* | 6/2004 | O'Neill | G06F 9/542 |
| | | | 718/107 |
| 2005/0028174 A1 | 2/2005 | Rossmann | |
| 2005/0262077 A1 | 11/2005 | Barnes | |
| 2009/0055511 A1* | 2/2009 | Berry | G06Q 10/107 |
| | | | 709/218 |
| 2010/0146243 A1 | 6/2010 | Balko | |
| 2015/0229545 A1 | 8/2015 | Cheung | |
| 2016/0094483 A1 | 3/2016 | Johnston | |
| 2017/0344971 A1* | 11/2017 | Kargman | G06Q 30/0601 |
| 2018/0329761 A1 | 11/2018 | Gokavarapu | |

OTHER PUBLICATIONS

Vargas, Luis et al.; Transactions in Distributed Event-Based Middleware; 8th IEEE International Conference on E-commerce Technology and 3rd IEEE International Conference on Enterprise Computing, E-Commerce, and E-Services; Jun. 26-29, 2006; 4 pages.

* cited by examiner

300

```
var oracledb = require('oracledb');
var transaction = require('tran')

var connectString = 'Oracle...';

var mytran = new transaction.Tran():
registerRM(mytran, connectString)
        .then(null, tranFail);

beginTransaction(mytran)
        .then(transferMoney, tranFail);

function transferMoney() {
    console.log("Money transfer initiated");
    /* business logic here (work in oracle, db2, ...) */ if (/* logic is successful */ ) {
        commitTransaction(mytran)
            .then(tranSuccess, tranFail);
    }
    else {
        rollbackTransaction(mytran)
            .then(tranSuccess, tranFail);
    }
}
function tranFail(err) {
    console.log('transaction failed due to \"' + err + '\" ');
}
function tranSuccess() {
    console.log('transaction successfully completed');
}
```

*FIG. 3*

INTEGRATING TRANSACTION PROCESSING SYSTEM INTERFACES WITH EVENT-DRIVEN POLYGLOT RUNTIME MODULES

CROSS REFERENCE TO RELATED APPLICATIONS

This application is a continuation application claiming priority to Ser. No. 15/591,280 filed May 10, 2017, now U.S. Pat. No. 10,379,916, issued Aug. 13, 2019 the contents of which are hereby incorporated by reference.

BACKGROUND

The present invention relates to managing transaction processing systems, more particularly to integrating transactional operations into an event-driven polyglot language runtime environment.

As requirements of end users change, new computer programming paradigms are created to fulfill these requirements. Because of advancements in internet technology and mobile phones, application developers attempt to develop and release applications as quickly as possible, thereby triggering a development of a new set of programming languages. The new programming languages allow software development to avoid the lifecycle of (1) code, (2) compile, (3) link, (4) test, and (5) deploy and instead use (1) code, (2) test, and (3) deploy because the new programming languages are dynamically typed and interpreted, which allows development time to be significantly compressed.

Due to their ease of use and the expressive power they provide to software developers, many of the new programming languages have rapidly expanded beyond the particular purposes for which they were originally designed. As one example, the JavaScript® programming language was originally written as a language to be embedded in a web browser to provide web pages with a limited set of programmable content, but the recent popularity of the JavaScript® language with developers has caused its use to be expanded from the browser to the server side and to the data center. By using frameworks such as the Node.js® runtime environment, the JavaScript® language is now a high quality server side programming language. JavaScript® is a registered trademark of Oracle America, Inc. located in Redwood Shores, Calif. Node.js® is a registered trademark of Joyent, Inc. located in San Francisco, Calif.

Many enterprise customers have existing applications that are transactional applications, many of which use transactional middleware platforms. These transactional middleware platforms are well-integrated with traditional programming languages in existing procedural and object oriented transaction processing systems.

SUMMARY

In one embodiment, the present invention provides a method of providing transactional operations in an event-driven polyglot language runtime environment. The method includes a computer exposing native functionalities of a transaction processing system as interfaces to multiple languages and frameworks in the event-driven polyglot language runtime environment. The native functionalities provide the transactional operations. The method further includes the computer generating application programming interfaces (APIs) for the event-driven polyglot language runtime environment. The method further includes via the APIs, the computer calling the transactional operations from modules within the event-driven polyglot language runtime environment. The method further includes based in part on the native functionalities of the transaction processing system being exposed and the transactional operations being called from the modules within the event-driven polyglot language runtime environment via the APIs, the computer integrating the transaction processing system with the modules within the event-driven polyglot language runtime environment.

In another embodiment, the present invention provides a computer program product including a computer-readable storage medium and a computer-readable program code stored in the computer-readable storage medium. The computer-readable program code includes instructions that are executed by a central processing unit (CPU) of a computer system to implement a method of providing transactional operations in an event-driven polyglot language runtime environment. The method includes the computer system exposing native functionalities of a transaction processing system as interfaces to multiple languages and frameworks in the event-driven polyglot language runtime environment. The native functionalities provide the transactional operations. The method further includes the computer system generating application programming interfaces (APIs) for the event-driven polyglot language runtime environment. The method further includes via the APIs, the computer system calling the transactional operations from modules within the event-driven polyglot language runtime environment. The method further includes based in part on the native functionalities of the transaction processing system being exposed and the transactional operations being called from the modules within the event-driven polyglot language runtime environment via the APIs, the computer system integrating the transaction processing system with the modules within the event-driven polyglot language runtime environment.

In another embodiment, the present invention provides a computer system including a central processing unit (CPU); a memory coupled to the CPU; and a computer-readable storage device coupled to the CPU. The storage device includes instructions that are executed by the CPU via the memory to implement a method of providing transactional operations in an event-driven polyglot language runtime environment. The method includes the computer system exposing native functionalities of a transaction processing system as interfaces to multiple languages and frameworks in the event-driven polyglot language runtime environment. The native functionalities provide the transactional operations. The method further includes the computer system generating application programming interfaces (APIs) for the event-driven polyglot language runtime environment. The method further includes via the APIs, the computer system calling the transactional operations from modules within the event-driven polyglot language runtime environment. The method further includes based in part on the native functionalities of the transaction processing system being exposed and the transactional operations being called from the modules within the event-driven polyglot language runtime environment via the APIs, the computer system integrating the transaction processing system with the modules within the event-driven polyglot language runtime environment.

Embodiments of the present invention allows enterprise applications that are transactional and that use transactional middleware to be integrated and interoperable with event-driven programming languages and frameworks in a polyglot runtime environment. The integration of the modern event-driven polyglot runtime environments with existing transaction processing systems, avoids costly and time-consuming changes to the code of the transaction processing systems or complete redesigns of the transaction processing systems.

BRIEF DESCRIPTION OF THE DRAWINGS

FIG. 3 is an example of a code snippet that invokes transactional interfaces in the process of FIG. 2, in accordance with embodiments of the present invention.

DETAILED DESCRIPTION

Overview

Embodiments of the present invention integrate existing procedural or object oriented transaction processing systems with event-driven programming frameworks without requiring any changes (or requiring only minimal changes) to the existing transaction processing systems. The integration of the existing transaction processing systems with the event-driven programming frameworks adheres to contracts and standards associated with the existing transaction processing systems by addressing callback handling, XA calls made in different thread contexts, nested transactions, event-driven loose coupling and tight coupling, and handling multiple resource managers. Embodiments map transaction identifiers across threads and existing procedural transaction processing systems. Embodiments manage connections in an event-driven programming framework by constructing the resource managers by leveraging existing transaction processing system interfaces.

As used herein, XA refers to the XA standard for distributed transaction processing (DTP). The XA standard is specified by The Open Group® industry consortium and describes the interface between a global transaction manager and a local resource manager. The Open Group® is a registered trademark of Open Group L.L.C. located in Burlington, Mass.

Figure 1:
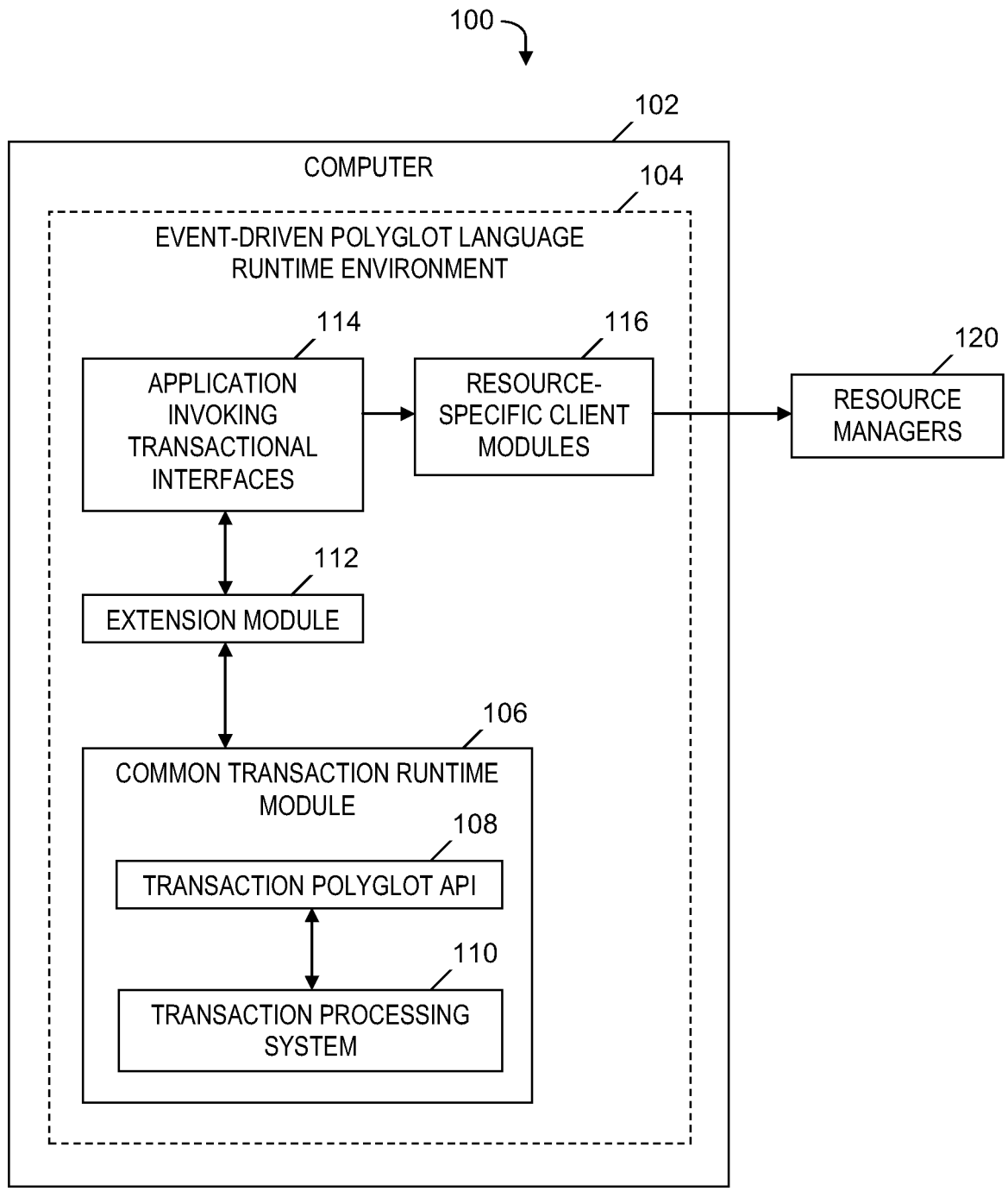
FIG. 1 is a block diagram of a system for providing transactional operations in an event-driven polyglot language runtime environment, in accordance with embodiments of the present invention.

System for Providing Transactional Operations in an Event-Driven Polyglot Language Runtime Environment FIG. 1 is a block diagram of a system 100 for providing transactional operations in an event-driven polyglot language runtime environment, in accordance with embodiments of the present invention. System 100 includes a computer 102, which operates in an event-driven polyglot language runtime environment 104 (hereinafter also referred to as runtime environment 104), and which executes a software-based common transaction runtime module 106, which includes a transaction polyglot application programming interface (API) 108 and a transaction processing system 110. Common transaction runtime module 106 includes other components, which are described below in the discussion of FIG. 4. Transaction processing system 110 may be a procedural or an object-oriented system. Transaction polyglot API 108 exposes interfaces to transaction processing system 110, and specifies how to obtain requests from extension module 112, which receives the requests from application 114. In alternate embodiments, system 100 includes multiple transaction processing systems, and transaction polyglot API 108 is implemented for each of the transaction processing systems. Hereinafter, transaction processing system 110 is also referred to the transaction manager or the transaction processing manager.

Computer 102 also executes a software-based extension module 112, an application 114 which is a transactional application that invokes transactional interfaces, and resource-specific client modules 116, which manage connections to resource managers 120. Extension module 112 is an interface between (i) applications running in the runtime environment 104 and (ii) the transaction polyglot API 108. Transaction polyglot API 108 is a common API layer exposing transactional services of transaction processing system 110 to polyglot runtimes in runtime environment 104. Transaction processing system 110 provides modular transaction processing and has refactored components. Resource managers 120 manage and provide access to shared resources (not shown) that include databases.

In one embodiment, transaction processing system 110 adheres to an XA standard for DTP, which establishes a protocol for the relationship among transaction processing system 110, application 114, and resources (not shown) that are managed by resource managers 120. In one embodiment, transaction processing system 110 is a transactional middleware transaction processing manager. In one embodiment, event-driven programming frameworks in runtime environment 104 adhere to the existing XA standard for DTP (or another existing standard) without requiring changes to the XA standard for DTP (or the other existing standard), while (i) providing callback handling that avoids deadlocks, (ii) handling XA calls made in different thread contexts, (iii) supporting resource managers that do not support the XA standard, (iv) handling nested transactions, (v) providing loose coupling and event-driven tight coupling, and (vi) handling multiple resource managers.

For example, runtime environment 104 is a Node.js® event-driven runtime environment, application 114 is a server-side Node.js® JavaScript® application, resource-specific client modules 116 include a database driver for a database managed by resource managers 120, extension module 112 is a Tran C++ extension module for the Node.js® runtime environment, and transaction processing system 110 is a distributed transaction processing system that manages procedural transactions, such as Encina TRAN System. Resource managers 120 may include, for example, a DB2® database system.

In one embodiment, extension module 112 is a common transaction runtime interface library module that provides the language-specific implementation for the transaction polyglot API 108 and one or more other polyglot Tran APIs (not shown) within common transaction runtime module 106. For example, if extension module 112 corresponds to a Node.js® framework, the polyglot Tran APIs are consumed in a C++ add-on module written for Node.js® V8 runtime. Using Node.js® V8 runtime extension modules, the Node.js® modules consume the transaction services in Node.js® applications. For synchronization of calls during the transaction execution, Node.js® transaction service modules utilize promises.

In one embodiment, common transaction runtime module 106 performs the following steps for a transaction: (1) initialize common transaction runtime module 106 (e.g., ctr_init); (2) create connections to resource managers 120 (i.e., resource specific interfaces); (3) enlist resources for the transaction (e.g., ctr_enlist); (4) mark the beginning of the transaction (e.g., ctr_begin); (5) perform the resource specific work; (6) mark the end of the transaction (e.g., ctr_end); and (7) commit or rollback the transaction (e.g., ctr_commit or ctr_rollback).

In alternate embodiments, system 100 includes multiple extension modules in communication with multiple transaction processing systems in a one-to-one correspondence, where each extension module corresponds to a specific event-driven programming language The functionality of the components shown in FIG. 1 is described in more detail in the discussion of FIG. 2, FIG. 4, FIG. 5, FIG. 6, FIG. 7, FIG. 8, and FIG. 9 presented below.

Figure 2:
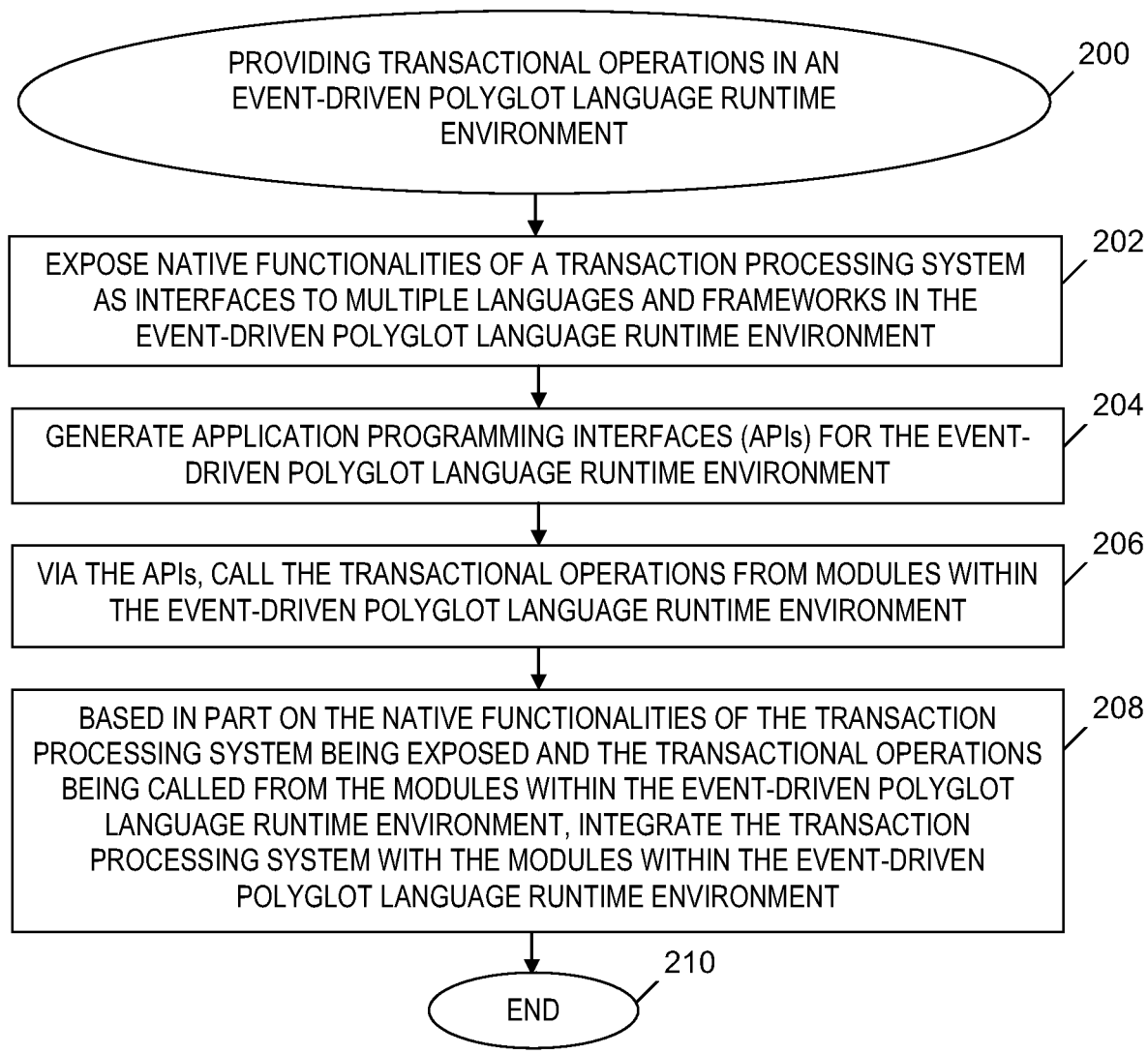
FIG. 2 is a flowchart of a process of providing transactional operations in an event-driven polyglot language runtime environment, where the process is implemented in the system of FIG. 1, in accordance with embodiments of the present invention.

Process for Providing Transactional Operations in an Event-Driven Polyglot Language Runtime Environment FIG. 2 is a flowchart of a process of providing transactional operations in an event-driven polyglot language runtime environment, where the process is implemented in the system of FIG. 1, in accordance with embodiments of the present invention. The process of FIG. 2 starts at step 200. In step 202, common transaction runtime module 106 (see FIG. 1) exposes native functionalities of transaction processing system 110 (see FIG. 1) as transactional interfaces to multiple programming languages and frameworks in runtime environment 104 (see FIG. 1).

In step 204, common transaction runtime module 106 (see FIG. 1) generates APIs for runtime environment 104, including transaction polyglot API 108 (see FIG. 1), and creates connections to resource managers 120 (see FIG. 1), where the connections are managed by resource-specific client modules 116 (see FIG. 1).

In step 206, via the APIs generated in step 204, code included in application 114 (see FIG. 1) calls transactional operations from modules within runtime environment 104 (see FIG. 1), and enlists resources required by the transactional operations.

In step 208, based at least in part on (i) the native functionalities of transaction processing system 110 (see FIG. 1) being exposed in step 202 and (ii) the transactional operations being called from the modules within the runtime environment 104 (see FIG. 1) in step 206, runtime environment 104 (see FIG. 1) integrates transaction processing system 110 (see FIG. 1) with extension module 112 (see FIG. 1), application 114 (see FIG. 1), and resource-specific client modules 116 (see FIG. 1) within runtime environment 104 (see FIG. 1) and via an invocation of the transactional interfaces. The aforementioned integration is utilized by common transaction runtime module 106 (see FIG. 1) to mark the beginning of each of the transactional operations, perform the transactional operations that require the enlisted resources, mark the end of each of the transactional operations, and perform a commit or a rollback of each the transactional operations.

The process of FIG. 2 ends at step 210.

FIG. 3 is an example of a code snippet 300 that invokes transactional interfaces in the process of FIG. 2, in accordance with embodiments of the present invention. Code snippet 300 is included in code of a JavaScript® app, which is an example of application 114 (see FIG. 1). Code snippet 300 includes new semantic constructs added to the app, including specifying the new transaction in the "var mytran=new transaction.Tran( )." Other new semantic constructs specify a new transactional interface (i.e. "registerRM(mytran, connnectString)" in code snippet 300), and new functions of begin the transaction, commit the transaction, and rollback the transaction (i.e., "beginTransaction (mytran)," "commitTransaction(mytran)," and "rollbackTransaction(mytran)" in code snippet 300).

Common Transaction Runtime Module

Figure 4:
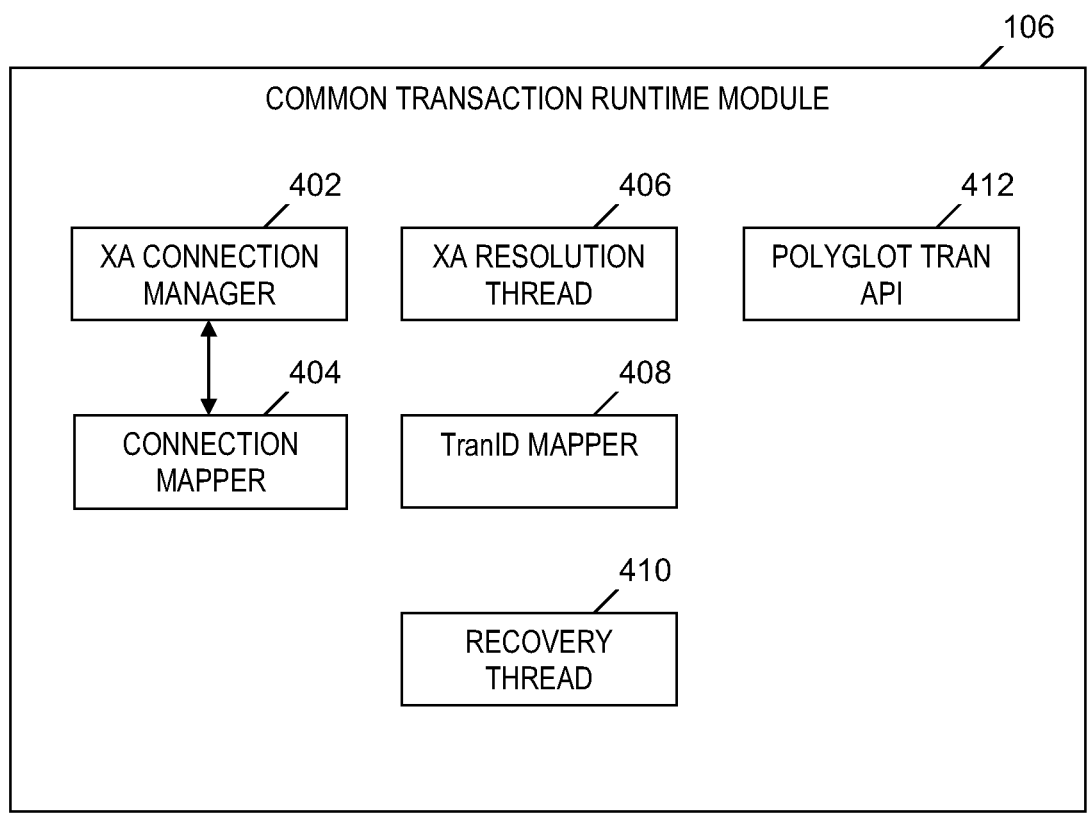
FIG. 4 is a block diagram of modules included in the common transaction runtime module in the system of FIG. 1, in accordance with embodiments of the present invention.

FIG. 4 is a block diagram of modules included in the common transaction runtime module 106 in the system of FIG. 1, in accordance with embodiments of the present invention. Common transaction runtime module 106 includes the following software-based components: XA connection manager 402, connection mapper 404, XA resolution thread 406, TranID mapper 408, recovery thread 410, and polyglot tran API module 412.

Polyglot tran API module 412 is a linkage between extension module 112 (see FIG. 1) and transaction processing system 110 (see FIG. 1). Polyglot tran API module 412 creates a common set of APIs to call transaction processing modules of transaction processing system 110 (see FIG. 1) for performing transactional operations such as commit, rollback, prepare, etc., and exposes the APIs to extension module 112 (see FIG. 1). The API created by polyglot tran API module 412 is an abstract layer that allows system 100 (see FIG. 1) to be transaction processing system agnostic, thereby allowing any transaction processing system to replace transaction processing system 110 (see FIG. 1). Furthermore, polyglot tran API module 412 provides transactional log capability for maintaining the transaction resolution flow for recovery purposes. The transactional log capability allows polyglot tran API module 412 to have knowledge of which transactions need to be recovered and which logs need to be played back for the recovery.

XA connection manager 402 initializes and manages XA connections with resource managers 120 (see FIG. 1). Further, XA connection manager 402 defines and manages a pool of XA connections (i.e., connection pool) with different resource managers included in resource managers 120 (see FIG. 1). In response to application 114 (see FIG. 1) needing an XA connection with a specific resource manager included in resource managers 120 (see FIG. 1), XA connection manager 402 services application 114 (see FIG. 1) from the managed XA connection. For example, in response to application 114 (see FIG. 1) needing to communicate with the DB2® database system in resource managers 120, application 114 (see FIG. 1) calls XA connection manager 402 and acquires an XA connection from the managed pool that corresponds to the DB2® database system.

In response to a resource manager being down, XA connection manager 402 (i) informs the transaction processing manager, (ii) uses an alternative resource manager if one is available, (iii) keeps monitoring the status of the resource manager, and (iv) takes action in response to the resource manager being up and running.

Connection mapper 404 maps the XA connection with the corresponding transaction manager and corresponding resource manager. The mapping provided by connection mapper 404 is used during XA resolution flow (i.e., commit or rollback).

In event-driven programming constructs, the events are handled by a single thread; therefore, a module (not shown) manages and resolves the XA connection with a specific thread (i.e., XA resolution thread 406). Based on XA resolution, XA resolution thread 406 propagates the XA calls for resolution to all active participants of the transaction. For example, the XA calls for a particular XA transaction (i.e., transactional operation) by application 114 (see FIG. 1) may include XA_PREPARE and either XA_COMMIT or XA_ROLLBACK. If application 114 (see FIG. 1) determines that the work done by the transaction should be made permanent and be perceived by other processes, then XA resolution thread 406 propagates the call for a commit process (i.e., XA_COMMIT). If application 114 (see FIG. 1) determines that the work done by the transaction should not be made permanent and perceived by other processes, then XA resolution thread 406 propagates the call for a rollback process (i.e., XA_ROLLBACK).

In an event-driven programming language environment such as in a Node.js® runtime environment, which is asynchronous in nature, every operation is performed in a different thread. Every thread has to certify or call XA_OPEN to a resource manager before performing any database operation. Process-wise certification is not recommended because any thread can perform a resolution operation and can result in a security breach.

The XA resolution thread 406 performs XA operations such as XA_OPEN, XA_PREPARE, and XA_COMMIT in an asynchronous manner. That is, common transaction runtime module 106 waits for a response to XA operation that is sent from a resource manager or the transaction manager, and then communicates the response to the thread requested for the XA operation. The XA resolution thread 406 receives a response indicating whether the actual resolution performed by the transaction manager is successful or not successful, and propagates that response back to application 114 (see FIG. 1) in the same thread. Only the dedicated XA resolution thread 406 makes the XA_OPEN call to initiate a performance of an XA operation. Other threads request the XA resolution thread 406 using an event-driven framework or another existing communication mechanism.

TranID mapper 408 is a software-based module that maps the XID (i.e., a transaction identifier) generated for an initiation of a transaction with an internal identifier of the transaction, where the internal identifier is generated by transaction processing system 110 (see FIG. 1) as an identifier of the transaction which is used internally within transaction processing system 110 (see FIG. 1). The XID is used every time common transaction runtime module 106 performs an XA resolution to ensure that the commit or rollback is being performed relative to the correct transaction (i.e., the transaction identified by the XID). Based on the XA resolution determined for the transaction, TranID mapper 408 performs the transaction resolution. TranID mapper 408 maintains a log of the performance of the transaction resolution operations.

If any of the participants of a transaction failed during the commit operation or if application 114 (see FIG. 1) explicitly calls the rollback operation, recovery thread 410 updates the transactional log information accordingly to indicate the failure (i.e., indicating that the commit could not be performed or the application has explicitly performed the rollback).

Recovery thread 410 monitors the transaction log. Based on the status of the transaction log indicating a need for a recovery relative to a transaction, recovery thread 410 performs recovery operations on the active resource managers using the internal identifier of the transaction retrieved from TranID mapper 408.

If common transaction runtime module 106 performs the prepare operation for a transaction and subsequent to performing the prepare operation, common transaction runtime module 106 detects abnormal terminations of the thread being used for the transaction, common transaction runtime module 106 activates recovery thread 410. Upon activation, recovery thread 410 identifies the XID of the transaction by accessing the object where the XID is present, and uses TranID 408 to obtain the internal identifier of the transaction. Based on the XID and the internal identifier, recovery thread 410 initiates a recovery operation for the transaction. Other threads wait for the XA resolution thread 406 to complete the recovery operation. If the XA resolution thread 406 fails, common transaction runtime module 106 activates recovery thread 410 to perform the recovery operation.

Figure 5:
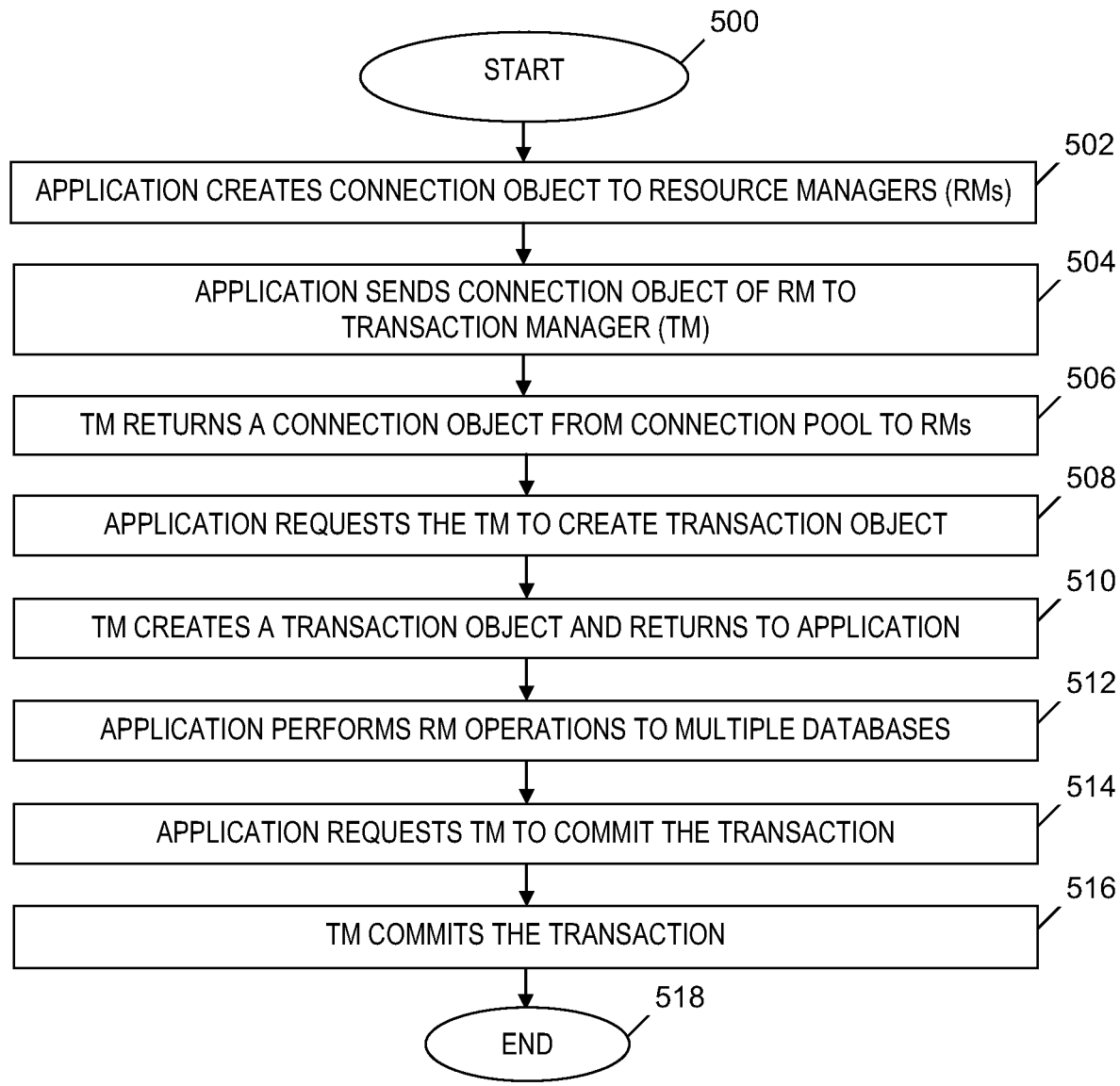
FIG. 5 is a flowchart of a process performed by an application and a transaction manager included in the system of FIG. 1, in accordance with embodiments of the present invention.

FIG. 5 is a flowchart of a process performed by application 114 and transaction processing system 110 included in the system of FIG. 1, in accordance with embodiments of the present invention. The process of FIG. 5 starts at step 500. In step 502, application 114 (see FIG. 1) creates a connection object to resource managers 120 (see FIG. 1).

In step 504, application 114 (see FIG. 1) sends the connection object of a resource manager (RM) included in resource managers 120 (see FIG. 1) to the transaction manager (TM) (i.e., transaction processing system 110 (see FIG. 1)).

In step 506, in response to receiving the connection object sent in step 504, the TM selects a connection object from the connection pool and returns the selected connected object to the RM via XA connection manager 402 (see FIG. 4).

In step 508, application 114 (see FIG. 1) requests the TM to create a transaction object.

In step 510, in response to the request in step 508, the TM creates the transaction object and sends the transaction object to application 114 (see FIG. 1).

In step 512, in response to receiving the transaction object sent in step 510, application 114 (see FIG. 1) performs the RM operations to multiple databases.

In step 514, application 114 (see FIG. 1) requests the TM to commit the transaction.

In step 516, in response to the request in step 514, TM commits the transaction. The process of FIG. 5 ends at step 518.

Figure 6:
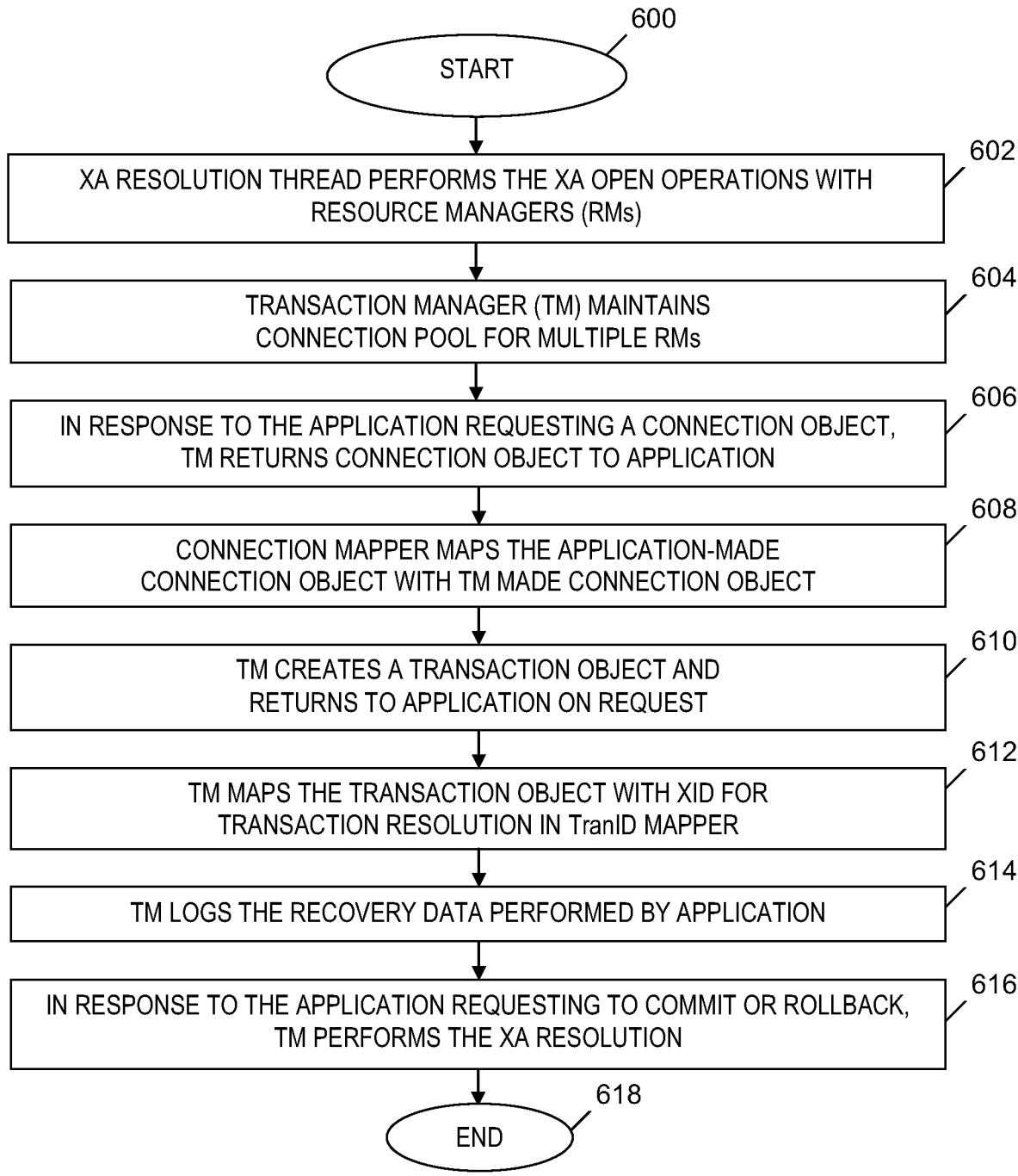
FIG. 6 is a flowchart of a transaction manager process performed by the common transaction runtime module included in the system of FIG. 1, in accordance with embodiments of the present invention.

FIG. 6 is a flowchart of a transaction manager process performed by common transaction runtime module 106 included in the system of FIG. 1, in accordance with embodiments of the present invention. The process of FIG. 6 starts at step 600. In step 602, XA resolution thread 406 (see FIG. 4) performs the XA OPEN operations with resource managers 120 (see FIG. 1) (i.e., RMs). The XA OPEN operation establishes a new connection from the transaction manager (TM) (i.e., transaction processing system 110 (see FIG. 1)) to a resource manager (RM) included in resource managers 120 (see FIG. 1).

In step 604, the TM maintains a connection pool for the multiple resource managers 120 (see FIG. 1) by using XA connection manager 402 (see FIG. 4).

Prior to step 606, application 114 (see FIG. 1) requests a connection object. In step 606, in response to application 114 (see FIG. 1) requesting the connection object, the TM sends the connection object to application 114 (see FIG. 1).

In step 608, connection mapper 404 (see FIG. 4) maps the application-made connection object with a TM-made connection object.

In step 610, the TM creates a transaction object and in response to a request for the transaction object from application 114 (see FIG. 1), the TM sends the transaction object to application 114 (see FIG. 1).

In step 612, the TM maps the transaction object with the XID for each transaction, so that transaction resolution takes place via TranID mapper 408 (see FIG. 1).

In step 614, the TM logs recovery data performed by application 114 (see FIG. 1).

Prior to step 616, application 114 (see FIG. 1) requests a commit or a rollback of the transaction. In step 616, in response to application 114 (see FIG. 1) requesting the commit or rollback, the TM performs the XA resolution corresponding to the requested commit or rollback. The process of FIG. 6 ends at step 618.

Figure 7:
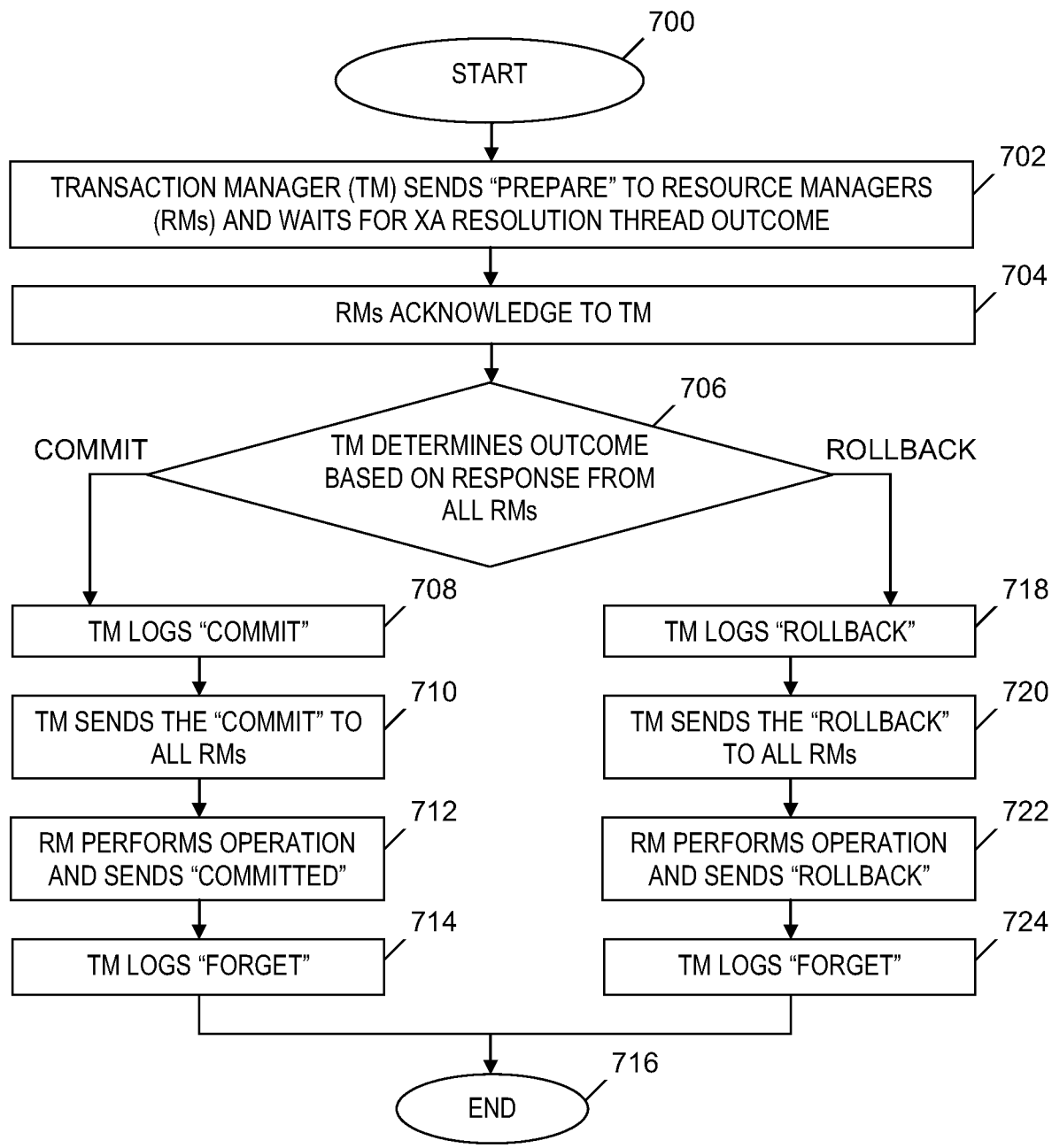
FIG. 7 is a flowchart of a process of an XA resolution performed by the common transaction runtime module included in the system of FIG. 1, in accordance with embodiments of the present invention.

FIG. 7 is a flowchart of a process of an XA resolution performed by the common transaction runtime module included in the system of FIG. 1, in accordance with embodiments of the present invention. The process of FIG. 7 starts at step 700. In step 702, the transaction manager (TM) (i.e., transaction processing system 110 (see FIG. 1)) sends a "prepare" call to the resource managers 120 (see FIG. 1) (i.e., RMs) that are participating in a transaction, and waits for the XA resolution thread 406 to finish preparing the XA resolution.

In step 704, the resource managers 120 (see FIG. 1) send acknowledgments indicating receipt of the "prepare" call to the TM.

In step 706, based on the acknowledgments from the resource managers 120 (see FIG. 1), the TM determines whether to commit or rollback the transaction.

If the TM determines in step 706 to commit the transaction, then the COMMIT branch of step 706 is followed and step 708 is performed. In step 708, the TM logs data at an initiation of the commit.

In step 710, the TM sends the commit call to resource managers 120 (see FIG. 1).

In step 712, a resource manager (RM) included in resource managers 120 (see FIG. 1) performs the commit operation and sends "COMMITTED" (i.e., an indication that the transaction is committed).

In step 714, the TM logs "FORGET" to forget the transaction based on the transaction having been committed. Following step 714, the process of FIG. 7 ends at step 716.

Returning to step 706, if the TM determines to rollback the transaction, then the ROLLBACK branch of step 706 is followed and step 718 is performed. In step 718, the TM logs data at an initiation of the rollback.

In step 720, the TM sends the rollback call to resource managers 120 (see FIG. 1).

In step 722, a resource manager (RM) included in resource managers 120 (see FIG. 1) performs the rollback operation and sends "ROLLBACK" (i.e., an indication that the transaction is rolled back).

In step 724, the TM logs "FORGET" to forget the transaction based on the transaction having been rolled back. Following step 724, the process of FIG. 7 ends at step 716.

Figure 8:
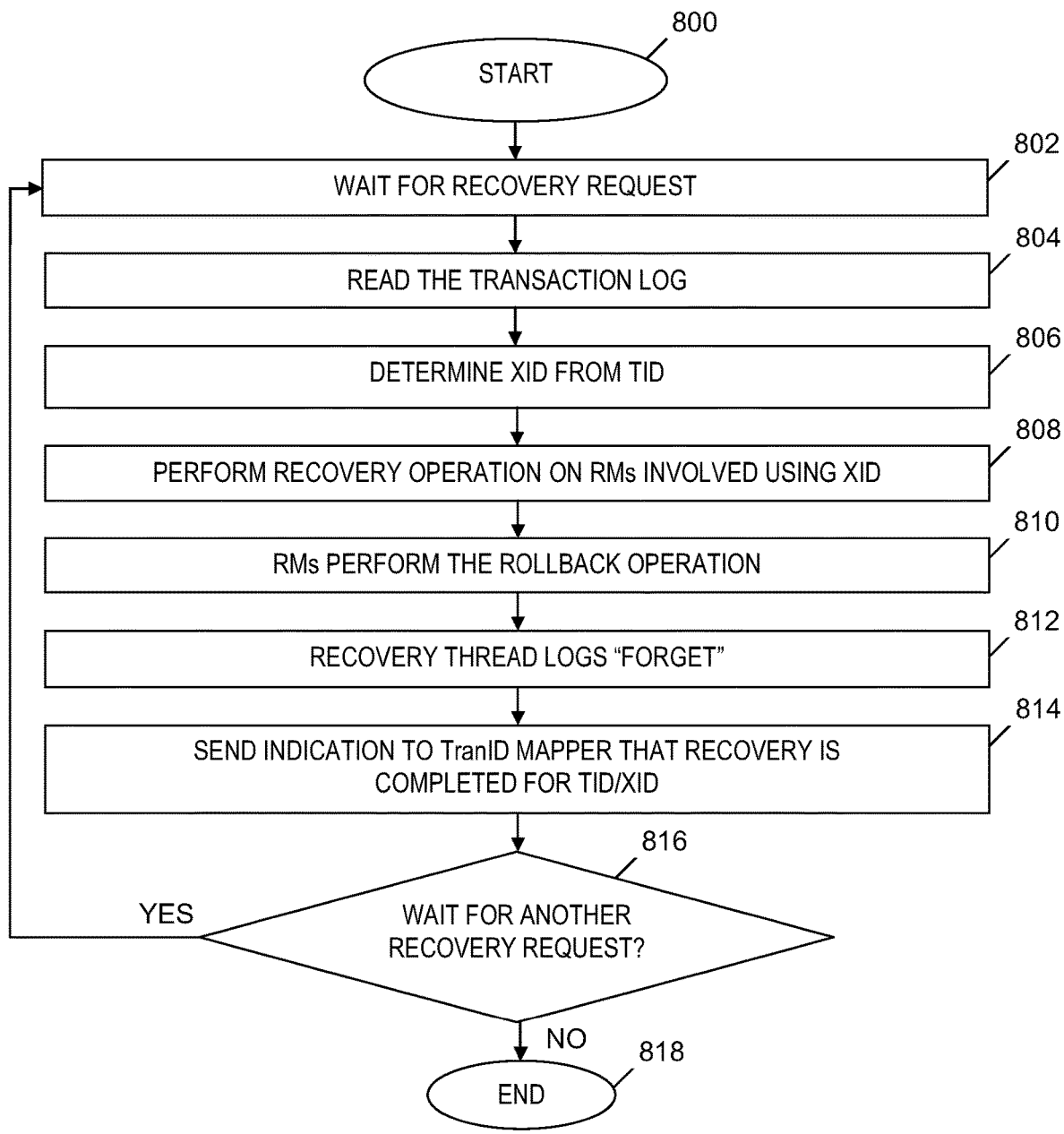
FIG. 8 is a flowchart of a process of recovery performed by the common transaction runtime module included in the system of FIG. 1, in accordance with embodiments of the present invention.

FIG. 8 is a flowchart of a process of recovery performed by the common transaction runtime module included in the system of FIG. 1, in accordance with embodiments of the present invention. The process of FIG. 8 starts at step 800. In step 802, recovery thread 410 (see FIG. 4) waits for a recovery request.

In step 804, in response to a receipt of a recovery request, recovery thread 410 (see FIG. 4) reads the transaction log. In step 806, recovery thread 410 (see FIG. 4) determines the internal identifier (i.e., transaction ID or TID) associated with the transaction and based on the TID, determines the XID of the transaction using the mapping generated by TranID mapper 408 (see FIG. 4).

In step 808, based on the XID, recovery thread 410 (see FIG. 4) performs the recovery operation by notifying resource managers (RMs) that are involved in the transaction, where the notified resource managers are included in resource managers 120 (see FIG. 1).

In step 810, the RMs notified in step 808 perform a rollback operation for the transaction and inform the participants of the transaction about the need to rollback.

In step 812, recovery thread 410 (see FIG. 4) logs "FORGET" to forget the transaction based on the recovery being completed for the XID and the rollback being completed.

In step 814, recovery thread 410 (see FIG. 4) sends tranID mapper 408 (see FIG. 4) an indication that the recovery operation is complete.

In step 816, recovery thread 410 (see FIG. 4) determines whether recovery thread 410 (see FIG. 4) needs to wait for another recovery request. If recovery thread 410 (see FIG. 4) determines in step 816 the need to wait for another recovery request, then the Yes branch of step 816 is taken and the process loops back to step 802. If recovery thread 410 (see FIG. 4) determines in step 816 that there is no need to wait for another recovery request, then the No branch of step 816 is taken and the process of FIG. 8 ends at step 818.

Computer System

Figure 9:
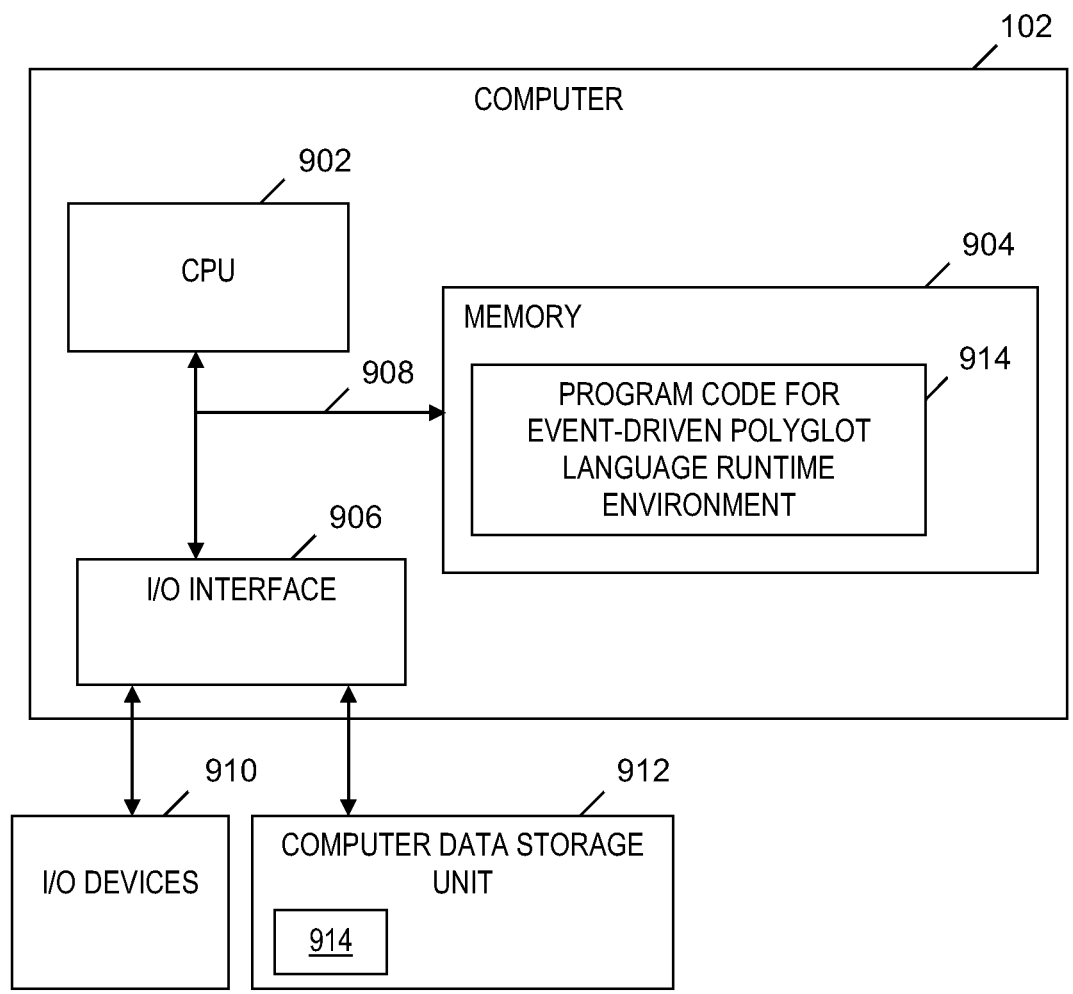
FIG. 9 is a block diagram of a computer included in the system of FIG. 1 and that implements the processes of FIG. 2 and FIGS. 5-8, in accordance with embodiments of the present invention.

FIG. 9 is a block diagram of a computer 102 included in system 100 of FIG. 1 and that implements the processes of FIG. 2 and FIGS. 5-8, in accordance with embodiments of the present invention. Computer 102 is a computer system that generally includes a central processing unit (CPU) 902, a memory 904, an input/output (I/O) interface 906, and a bus 908. Further, computer 102 is coupled to I/O devices 910 and a computer data storage unit 912. CPU 902 performs computation and control functions of computer 102, including executing instructions included in program code 914 for event-driven polyglot language runtime environment 104

(see FIG. 1) to perform a method of providing transactional operations in an event-driven polyglot language runtime environment, where the instructions are executed by CPU 902 via memory 904. CPU 902 may include a single processing unit, or be distributed across one or more processing units in one or more locations (e.g., on a client and server).

Memory 904 includes a known computer readable storage medium, which is described below. In one embodiment, cache memory elements of memory 904 provide temporary storage of at least some program code (e.g., program code 914) in order to reduce the number of times code must be retrieved from bulk storage while instructions of the program code are executed. Moreover, similar to CPU 902, memory 904 may reside at a single physical location, including one or more types of data storage, or be distributed across a plurality of physical systems in various forms. Further, memory 904 can include data distributed across, for example, a local area network (LAN) or a wide area network (WAN).

I/O interface 906 includes any system for exchanging information to or from an external source. I/O devices 910 include any known type of external device, including a display, keyboard, etc. Bus 908 provides a communication link between each of the components in computer 102, and may include any type of transmission link, including electrical, optical, wireless, etc.

I/O interface 906 also allows computer 102 to store information (e.g., data or program instructions such as program code 914) on and retrieve the information from computer data storage unit 912 or another computer data storage unit (not shown). Computer data storage unit 912 includes a known computer readable storage medium, which is described below. In one embodiment, computer data storage unit 912 is a non-volatile data storage device, such as a magnetic disk drive (i.e., hard disk drive) or an optical disc drive (e.g., a CD-ROM drive which receives a CD-ROM disk).

Memory 904 and/or storage unit 912 may store computer program code 914 that includes instructions that are executed by CPU 902 via memory 904 to provide transactional operations in an event-driven polyglot language runtime environment. Although FIG. 9 depicts memory 904 as including program code, the present invention contemplates embodiments in which memory 904 does not include all of code 914 simultaneously, but instead at one time includes only a portion of code 914.

Further, memory 904 may include an operating system (not shown) and may include other systems not shown in FIG. 9.

Storage unit 912 and/or one or more other computer data storage units (not shown) that are coupled to computer 102 may include one or more data repositories used by resource managers 120 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to providing transactional operations in an event-driven polyglot language runtime environment. Thus, an embodiment of the present invention discloses a process for supporting computer infrastructure, where the process includes providing at least one support service for at least one of integrating, hosting, maintaining and deploying computer-readable code (e.g., program code 914) in a computer system (e.g., computer 102) including one or more processors (e.g., CPU 902), wherein the processor(s) carry out instructions contained in the code causing the computer system to provide transactional operations in an event-driven polyglot language runtime environment.

Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of providing transactional operations in an event-driven polyglot language runtime environment.

While it is understood that program code 914 for providing transactional operations in an event-driven polyglot language runtime environment may be deployed by manually loading directly in client, server and proxy computers (not shown) via loading a computer readable storage medium (e.g., computer data storage unit 912), program code 914 may also be automatically or semi-automatically deployed into computer 102 by sending program code 914 to a central server or a group of central servers. Program code 914 is then downloaded into client computers (e.g., computer 102) that will execute program code 914. Alternatively, program code 914 is sent directly to the client computer via e-mail. Program code 914 is then either detached to a directory on the client computer or loaded into a directory on the client computer by a button on the e-mail that executes a program that detaches program code 914 into a directory. Another alternative is to send program code 914 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 914 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of providing transactional operations in an event-driven polyglot language runtime environment. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium or media (i.e., memory 904 and computer data storage unit 912) having computer readable program instructions 914 thereon for causing a processor (e.g., CPU 902) to carry out aspects of the present invention.

The computer readable storage medium can be a tangible device that can retain and store instructions (e.g., program code 914) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 914) described herein can be downloaded to respective computing/processing devices (e.g., computer 102) from a computer readable storage medium or to an external computer or external storage device (e.g., computer data storage unit 912) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 914) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIGS. 5-8) and/or block diagrams (e.g., FIG. 1 and FIG. 9) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 914).

These computer readable program instructions may be provided to a processor (e.g., CPU 902) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 912) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 914) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of providing transactional operations in an event-driven polyglot language runtime environment, the method comprising the steps of:

a computer exposing native functionalities of a transaction processing system as interfaces to multiple languages and frameworks in the event-driven polyglot language runtime environment, the native functionalities providing the transactional operations;

the computer generating application programming interfaces (APIs) for the event-driven polyglot language runtime environment;

via the APIs, the computer calling the transactional operations from modules within the event-driven polyglot language runtime environment;

based in part on the native functionalities of the transaction processing system being exposed and the transactional operations being called from the modules within the event-driven polyglot language runtime environment via the APIs, the computer integrating the transaction processing system with the modules within the event-driven polyglot language runtime environment;

the computer sending a prepare operation to a resource manager (RM) via a resolution thread in the event-driven polyglot language runtime environment;

the computer receiving a response from the RM;

based on the response, the computer determining whether an outcome of the resolution thread is a commit or a rollback of a transaction included in the transactional operations; and if the outcome is the commit of the transaction, the computer logging an indication of the commit, sending the indication of the commit to the RM, performing the commit, sending a committed indication that the commit has been completed, and logging a forget operation, or if the outcome is the rollback of the transaction, the computer logging an indication of the rollback, sending the indication of the rollback to the RM, performing the rollback, sending a rolled back indication that the rollback has been completed, and logging the forget operation.

2. The method of claim 1, further comprising the step of the computer mapping identifiers of transactions across (i) threads provided by one or more of the frameworks in the event-driven polyglot language runtime environment and (ii) the transaction processing system.

3. The method of claim 1, further comprising the step of the computer managing connections to respective resource managers within the modules in the event-driven polyglot language runtime environment by employing interfaces of the transaction processing system.

4. The method of claim 1, further comprising the step of the computer providing a recovery mechanism for the modules in the event-driven polyglot language runtime environment interacting with the transaction processing system.

5. The method of claim 1, wherein the steps of exposing the native functionalities, generating the APIs, calling the transactional operations, and integrating the transaction processing system with the modules within the event-driven polyglot language runtime environment are performed without requiring a change to a functionality of the transaction processing system that provides object oriented transaction processing or procedural transaction processing.

6. The method of claim 1, further comprising the steps of:
the computer receiving a request to perform a recovery of the transaction;
the computer reading a transaction log associated with the transaction;
the computer determining a transaction identifier that identifies the transaction;

the computer performing a recovery operation on the RM which uses the transaction identifier, the performance of the recovery operation resulting in the RM performing a rollback operation; and
the computer logging a forget operation.

7. The method of claim 1, further comprising the step of:
providing at least one support service for at least one of creating, integrating, hosting, maintaining, and deploying computer readable program code in the computer, the program code being executed by a processor of the computer to implement the steps of exposing the native functionalities, generating the APIs, calling the transactional operations, integrating the transaction processing system with the modules within the event-driven polyglot language runtime environment, sending the prepare operation to the RM, receiving the response from the RM, determining whether the outcome of the resolution thread is the commit or the rollback of the transaction, and (i) if the outcome is the commit of the transaction, logging the indication of the commit, sending the indication of the commit to the RM, performing the commit, sending the committed indication that the commit has been completed, and logging the forget operation, or (ii) if the outcome is the rollback of the transaction, logging the indication of the rollback, sending the indication of the rollback to the RM, performing the rollback, sending the rolled back indication that the rollback has been completed, and logging the forget operation.

8. A computer program product, comprising:
a computer readable storage medium; and
a computer readable program code stored in the computer readable storage medium, the computer readable program code containing instructions that are executed by a central processing unit (CPU) of a computer system to implement a method of providing transactional operations in an event-driven polyglot language runtime environment, the method comprising the steps of:
the computer system exposing native functionalities of a transaction processing system as interfaces to multiple languages and frameworks in the event-driven polyglot language runtime environment, the native functionalities providing the transactional operations;
the computer system generating application programming interfaces (APIs) for the event-driven polyglot language runtime environment;
via the APIs, the computer system calling the transactional operations from modules within the event-driven polyglot language runtime environment;
based in part on the native functionalities of the transaction processing system being exposed and the transactional operations being called from the modules within the event-driven polyglot language runtime environment via the APIs, the computer system integrating the transaction processing system with the modules within the event-driven polyglot language runtime environment;
the computer system sending a prepare operation to a resource manager (RM) via a resolution thread in the event-driven polyglot language runtime environment;
the computer system receiving a response from the RM;
based on the response, the computer system determining whether an outcome of the resolution thread is a commit or a rollback of a transaction included in the transactional operations; and if the outcome is the commit of the transaction, the computer system logging an indication of the commit, sending the indication of the commit to the RM, performing the commit, sending a committed indication that the commit has been completed, and logging a forget operation, or if the outcome is the rollback of the transaction, the computer system logging an indication of the rollback, sending the indication of the rollback to the RM, performing the rollback, sending a rolled back indication that the rollback has been completed, and logging the forget operation.

9. The computer program product of claim 8, wherein the method further comprises the step of the computer system mapping identifiers of transactions across (i) threads provided by one or more of the frameworks in the event-driven polyglot language runtime environment and (ii) the transaction processing system.

10. The computer program product of claim 8, wherein the method further comprises the step of the computer system managing connections to respective resource managers within the modules in the event-driven polyglot language runtime environment by employing interfaces of the transaction processing system.

11. The computer program product of claim 8, wherein the method further comprises the step of the computer system providing a recovery mechanism for the modules in the event-driven polyglot language runtime environment interacting with the transaction processing system.

12. The computer program product of claim 8, wherein the steps of exposing the native functionalities, generating the APIs, calling the transactional operations, and integrating the transaction processing system with the modules within the event-driven polyglot language runtime environment are performed without requiring a change to a functionality of the transaction processing system that provides object oriented transaction processing or procedural transaction processing.

13. The computer program product of claim 8, wherein the method further comprises the steps of:

the computer receiving a request to perform a recovery of the transaction;

the computer reading a transaction log associated with the transaction;

the computer determining a transaction identifier that identifies the transaction;

the computer performing a recovery operation on the RM which uses the transaction identifier, the performance of the recovery operation resulting in the RM performing a rollback operation; and the computer logging a forget operation.

14. A computer system comprising:

a central processing unit (CPU);

a memory coupled to the CPU; and a computer readable storage device coupled to the CPU, the storage device containing instructions that are executed by the CPU via the memory to implement a method of providing transactional operations in an event-driven polyglot language runtime environment, the method comprising the steps of:

the computer system exposing native functionalities of a transaction processing system as interfaces to multiple languages and frameworks in the event-driven polyglot language runtime environment, the native functionalities providing the transactional operations;

the computer system generating application programming interfaces (APIs) for the event-driven polyglot language runtime environment;

via the APIs, the computer system calling the transactional operations from modules within the event-driven polyglot language runtime environment;

based in part on the native functionalities of the transaction processing system being exposed and the transactional operations being called from the modules within the event-driven polyglot language runtime environment via the APIs, the computer system integrating the transaction processing system with the modules within the event-driven polyglot language runtime environment;

the computer system sending a prepare operation to a resource manager (RM) via a resolution thread in the event-driven polyglot language runtime environment;

the computer system receiving a response from the RM;

based on the response, the computer system determining whether an outcome of the resolution thread is a commit or a rollback of a transaction included in the transactional operations; and if the outcome is the commit of the transaction, the computer system logging an indication of the commit, sending the indication of the commit to the RM, performing the commit, sending a committed indication that the commit has been completed, and logging a forget operation, or if the outcome is the rollback of the transaction, the computer system logging an indication of the rollback, sending the indication of the rollback to the RM, performing the rollback, sending a rolled back indication that the rollback has been completed, and logging the forget operation.

15. The computer system of claim 14, wherein the method further comprises the step of the computer system mapping identifiers of transactions across (i) threads provided by one or more of the frameworks in the event-driven polyglot language runtime environment and (ii) the transaction processing system.

16. The computer system of claim 14, wherein the method further comprises the step of the computer system managing connections to respective resource managers within the modules in the event-driven polyglot language runtime environment by employing interfaces of the transaction processing system.

17. The computer system of claim 14, wherein the method further comprises the step of the computer system providing a recovery mechanism for the modules in the event-driven polyglot language runtime environment interacting with the transaction processing system.

18. The computer system of claim 14, wherein the steps of exposing the native functionalities, generating the APIs, calling the transactional operations, and integrating the transaction processing system with the modules within the event-driven polyglot language runtime environment are performed without requiring a change to a functionality of the transaction processing system that provides object oriented transaction processing or procedural transaction processing.

19. The computer system of claim 14, wherein the method further comprises the steps of:

the computer receiving a request to perform a recovery of the transaction;
the computer reading a transaction log associated with the transaction;
the computer determining a transaction identifier that identifies the transaction;
the computer performing a recovery operation on the RM which uses the transaction identifier, the performance of the recovery operation resulting in the RM performing a rollback operation; and
the computer logging a forget operation.

* * * * *